United States Patent
Ishibashi et al.

(10) Patent No.: US 8,401,344 B2
(45) Date of Patent: Mar. 19, 2013

(54) SEMICONDUCTOR OPTICAL MODULATOR AND OPTICAL MODULATING APPARATUS

(75) Inventors: Tadao Ishibashi, Yokohama (JP); Kazuhiro Maruyama, Yokohama (JP); Kenji Kobayashi, Yokohama (JP); Tomoyuki Akeyoshi, Yokohama (JP); Nobuhiro Kikuchi, Atsugi (JP); Ken Tsuzuki, Atsugi (JP); Mitsuteru Ishikawa, Atsugi (JP)

(73) Assignees: NTT Electronics Corporation, Kanagawa (JP); Nippon Telegraph and Telephone Corporation, Tokyo (JP)

( * ) Notice: Subject to any disclaimer, the term of this patent is extended or adjusted under 35 U.S.C. 154(b) by 368 days.

(21) Appl. No.: 12/811,565

(22) PCT Filed: Dec. 26, 2008

(86) PCT No.: PCT/JP2008/073724
§ 371 (c)(1),
(2), (4) Date: Jul. 2, 2010

(87) PCT Pub. No.: WO2009/087927
PCT Pub. Date: Jul. 16, 2009

(65) Prior Publication Data
US 2010/0296769 A1    Nov. 25, 2010

(30) Foreign Application Priority Data

Jan. 10, 2008 (JP) .................. 2008-003201

(51) Int. Cl.
*G02F 1/035* (2006.01)
(52) U.S. Cl. .................. 385/2; 385/8; 385/131
(58) Field of Classification Search .......... 385/2
See application file for complete search history.

(56) References Cited

U.S. PATENT DOCUMENTS

2007/0172184 A1   7/2007   Ishicashi et al. ............. 385/129
2007/0195847 A1*  8/2007   Fukamachi et al. ....... 372/46.01
(Continued)

FOREIGN PATENT DOCUMENTS

CN    1864092 A    11/2006
EP    1 672 410 A1   6/2006
(Continued)

OTHER PUBLICATIONS

International Search Report dated Mar. 24, 2009 for corresponding International Patent Application No. PCT/JP2008/073724 (w/ English translation).

(Continued)

*Primary Examiner* — Hemang Sanghavi
(74) *Attorney, Agent, or Firm* — Ohlandt, Greeley, Ruggiero and Perle, L.L.P.

(57) ABSTRACT

A semiconductor optical modulator that includes a first semiconductor optical waveguide having a laminated structure including a core layer, a first clad layer, a second clad layer, and a barrier layer, the first clad layer and the second clad layer being disposed below and above the core layer, the barrier layer being inserted between the second clad layer and the core layer; a second semiconductor optical waveguide having a laminated structure in which the second clad layer has a p-type semiconductor penetrating locally through a n-type semiconductor in a laminated direction in the laminated structure of the first semiconductor optical waveguide; a first electrode connected to the first clad layer of the first semiconductor optical waveguide; and a second electrode electrically connecting the second clad layer of the first semiconductor optical waveguide and the p-type semiconductor of the second clad layer of the second semiconductor optical waveguide.

4 Claims, 3 Drawing Sheets

U.S. PATENT DOCUMENTS

| | | | |
|---|---|---|---|
| 2007/0297475 A1* | 12/2007 | Sasada et al. | 372/44.01 |
| 2008/0260320 A1* | 10/2008 | Laval et al. | 385/2 |
| 2008/0304786 A1 | 12/2008 | Ishibashi et al. | 385/3 |
| 2009/0034904 A1 | 2/2009 | Tsuzuki et al. | 385/14 |
| 2010/0142026 A1* | 6/2010 | Kato | 359/248 |
| 2012/0183249 A1* | 7/2012 | Sato et al. | 385/2 |

FOREIGN PATENT DOCUMENTS

| | | |
|---|---|---|
| EP | 1 857 857 A1 | 11/2007 |
| JP | 2005-099387 | 4/2005 |
| JP | 2005-114868 | 4/2005 |
| JP | 2005-116644 | 4/2005 |
| JP | 2006-251088 | 9/2006 |
| WO | WO 2006/095776 A1 | 9/2006 |

OTHER PUBLICATIONS

Office Action for corresponding Chinese Patent Application No. 200880124499.X dated Mar. 28, 2012 with English translation.

Extended European Search Report dated Dec. 5, 2011 for corresponding European Patent Application No. 08869482.3.

* cited by examiner

FIG. 1

PRIOR ART

FIG. 2

PRIOR ART

FIG. 3

PRIOR ART

SEMICONDUCTOR OPTICAL MODULATOR AND OPTICAL MODULATING APPARATUS

BACKGROUND

1. Field of the Disclosure

The present disclosure relates to a semiconductor optical modulator that is operated at an ultrafast speed in a long-wavelength range and an optical modulating apparatus in which the semiconductor optical modulator is used.

2. Discussion of the Background Art

A method for combining a laser diode light source and external modulator to generate an optical signal is usually adopted in a transmitter used in a high-density multiple-wavelength optical communication system. The typical external modulator used in this kind of purpose is a LiNbO$_3$ (hereinafter abbreviated as "LN") modulator formed by an LN waveguide. The modulation of a refractive index by an electro-optic effect is a basic operation of the LN modulator and an optical intensity modulator in which a Mach-Zehnder interferometer is incorporated is also available in addition to a simple optical phase modulator.

Recently attention is focused on a semiconductor optical modulator that is superior to the LN modulator in miniaturization. Examples of the semiconductor optical modulator include a GaAs optical modulator in which a Schottky electrode is disposed in semi-insulating GaAs to utilize the Schottky electrode as a photoelectron waveguide and an InP/InGaAsP optical modulator in which a voltage is effectively applied to a core portion of the waveguide while light is confined using a pin heterojunction.

Although the semiconductor optical modulator has the advantage of miniaturization, unfortunately the semiconductor optical modulator has a high driving voltage, therefore, as a structure to avoid the problem, there has been proposed such an npin-type semiconductor optical modulator that both InP clad layers are formed into an n-type and a thin p-type semiconductor layer (p-type barrier layer) is inserted as a barrier layer to suppress an electron current (for example, see Patent Document 1). Because the p-type clad layer which causes an optical loss is not used in the npin-type, a relatively long waveguide can be used, and the npin-type is superior in reducing the driving voltage. Because the npin-type has a degree of freedom of optimally-designing arbitrarily a thickness of a depletion layer, advantageously matching of electric impedance and matching of electric speed/light speed are easily satisfied at the same time, and the npin-type is superior in speed enhancement.

In the npin-type semiconductor optical modulator structure, it is well known that a conductivity of an upper n-type clad layer is larger than that of conventional pin-type p-type clad layer. This means that, in the npin-type having a uniform structure, an modulation electric signal that should be applied to the waveguide only in a light travelling direction along an anode electrode above the waveguide leaks through the n-type clad layer to the waveguide in which the anode electrode does not exist. Occasionally a constant DC bias is also applied to the waveguide, and similarly the DC bias is also applied to the waveguide in which the anode electrode does not exist. Because the leakage of the electric signal or DC bias has an influence on a modulation operation, in the npin-type semiconductor optical modulator structure, a waveguide electric separation technique is adopted, where the waveguide is separated into a portion in which the electric signal and the DC bias are applied to the waveguide and a portion in which the electric signal and the DC bias are not applied to the waveguide.

Figure 1:
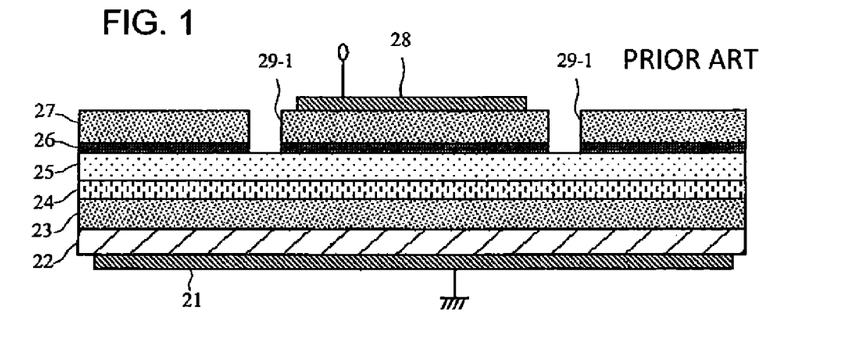
FIG. 1 is a view illustrating a structure of a conventional npin-type semiconductor optical modulator.

FIG. 1 illustrates an example of the waveguide electric separation technique. In the npin-type semiconductor optical modulator structure of FIG. 1, a layer configuration of the waveguide 24 is formed in the order of n-p-i-n from above, and the upper n-type second clad layer 27 and p-type barrier layer 26 are partially recessed to form electric separation grooves (groove) 29-1, thereby adopting the waveguide electric separation technique.

However, in the waveguide electric separation technique adopted in the npin-type semiconductor optical modulator structure of FIG. 1, light scattering is generated by the local unevenness of the waveguide, while the electric separation is completely performed, therefore, it is necessary to solve the problem of the optical diffraction loss.

Figure 2:
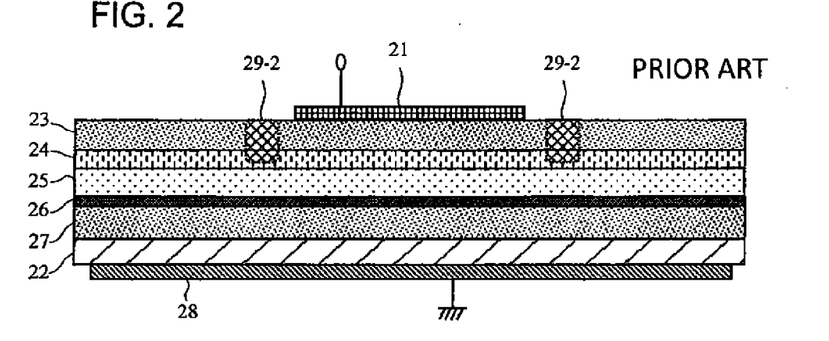
FIG. 2 is a view illustrating a structure of a conventional nipn-type semiconductor optical modulator.

FIG. 2 illustrates an example of the waveguide electric separation technique in which the optical diffraction loss is solved. In the npin-type semiconductor optical modulator structure of FIG. 2, a layer configuration of the waveguide 24 is formed in the order of n-i-p-n from above, and a local p-type region 29-2 reaching a lower surface of an n-type first clad layer 23 is re-formed by ion implantation of a p-type dopant or regrowth method (for example, see Patent Document 2).

Figure 3:
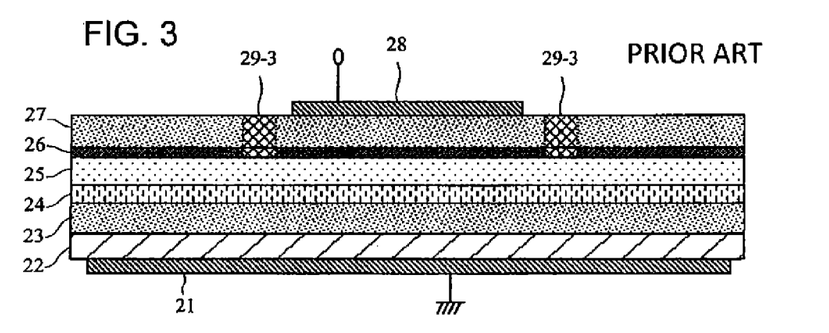
FIG. 3 is a view illustrating a structure of a conventional npin-type semiconductor optical modulator.

The nipn-type semiconductor optical modulator structure of FIG. 2 is opposite to the npin-type semiconductor optical modulator structure of FIG. 1 in the layer configuration from above of the waveguide 24. The reason will be described below. FIG. 3 illustrates an npin-type semiconductor optical modulator structure in which the waveguide electric separation technique of FIG. 2 is adopted. In the npin-type, because the local p-type region 29-3 is in contact with the p-type barrier layer 26, the waveguide electric separation cannot be performed certainly.

Specifically, the waveguide electric separation can be performed in the state in which a large DC bias is applied in the opposite direction to deplete the p-type barrier layer 26. However, in the state in which the p-type barrier layer 26 has the large total acceptor amount while the opposite DC bias is lower than a predetermined value, holes remaining in part of the p-type barrier layer 26 is neutralized, and the waveguide electric separation cannot be separated for a high-frequency electric signal. That is, even if the n-type second clad layer 27 in which the anode electrode 28 exists thereon and the n-type second clad layer 27 in which the anode electrode 28 does not exist thereon are electrically separated, the high-frequency electric signal leaks through the p-type barrier layer 26 to the waveguide 24 in the portion in which the anode electrode 28 does not exist thereon.

Because a potential at the p-type barrier layer 26 in an electrically "floating state" is unstable, a dark current changes depending on a temperature or a bias voltage, and an electric field of the waveguide 24 also changes. This has a large influence on long-term reliability of the element. Therefore the waveguide electric separation technique in which the p-type region is formed in the n-type clad layer, because the waveguide electric separation can be performed even if part of the barrier layer is neutralized, it is necessary to vertically invert the structure of the nipn-type.

Patent Document 1: Japanese Patent Application Laid-Open No. 2005-099387

Patent Document 2: Japanese Patent Application Laid-Open No. 2005-116644

However, there is a production problem in the nipn-type semiconductor optical modulator structure. Specifically, during epitaxial growth of each nipn-type semiconductor layer, an impurity background concentration of an i layer that constitutes the waveguide on the barrier layer hardly becomes a desired concentration (for example, $2\times10^{15}/cm^3$) or less due to the influence of the p-type dopant remaining in a growth atmosphere. Therefore, unfortunately the semiconductor optical modulator having good linearity to the electric signal input is hardly produced in the nipn-type semiconductor optical modulator structure.

SUMMARY

Then in order to solve the foregoing problem, an object of the present disclosure is to provide an npin-type semiconductor optical modulator in which the waveguide electric separation can be performed while the optical diffraction loss decreases and an optical modulating apparatus in which the npin-type semiconductor optical modulator is used.

In order to achieve the object, in a semiconductor optical modulator according to the disclosure, a p-type semiconductor region that is in local contact with a barrier layer is formed in an upper n-type clad layer.

Specifically, a semiconductor optical modulator according to the disclosure includes: a first semiconductor optical waveguide that has an electro-optic effect, the first semiconductor optical waveguide having a laminated structure including a core layer, a first clad layer, a second clad layer, and a barrier layer, the first clad layer and the second clad layer being disposed below and above the core layer, the first clad layer and the second clad layer which have refractive indexes lower than that of the core layer being made of an n-type semiconductor whose bandgap is wider than that of the core layer, the barrier layer being inserted between the second clad layer and the core layer, the barrier layer in which a potential barrier against electrons is formed being made of a p-type semiconductor; a second semiconductor optical waveguide that is connected to the first semiconductor optical waveguide in a light propagation direction, the second semiconductor optical waveguide having a laminated structure in which the second clad layer has the p-type semiconductor penetrating locally through the n-type semiconductor in a laminated direction in the laminated structure of the first semiconductor optical waveguide; a first electrode that is connected to the first clad layer of the first semiconductor optical waveguide; and a second electrode that electrically connects the second clad layer of the first semiconductor optical waveguide and the p-type semiconductor of the second clad layer of the second semiconductor optical waveguide.

In the semiconductor optical modulator, the groove of FIG. 1 is not formed, but the p-type semiconductor is formed in the second clad layer of the second semiconductor optical waveguide, so that the optical diffraction loss can be prevented. A potential at the barrier layer portion in the npin-type configuration can be fixed by the p-type semiconductor of the second clad layer, and the leakages of the DC bias and electric signal through the barrier layer can be suppressed. Accordingly, the disclosure can provide the npin-type semiconductor optical modulator in which the waveguide electric separation can be performed while the optical diffraction loss decreases and the optical modulating apparatus in which the npin-type semiconductor optical modulator is used.

The semiconductor optical modulator according to the disclosure may further include a substrate on which the first semiconductor optical waveguide and the second semiconductor optical waveguide are formed, wherein the laminated structure of the first semiconductor optical waveguide and the laminated structure of the second semiconductor optical waveguide further include: an n-type electrode layer that is located between the first clad layer and the substrate; a first low-concentration clad layer that is located between the first clad layer and the core layer, an impurity concentration of the first low-concentration clad layer being lower than that of the first clad layer; and a second low-concentration clad layer that is located between the core layer and the barrier layer, an impurity concentration of the second low-concentration clad layer being lower than that of the barrier layer.

The core layer is sandwiched between the first low-concentration clad layer and second low-concentration clad layer, which have the low impurity concentrations, so that the impurity can be prevented from diffusing to the core layer from the first clad layer and the second clad layer.

The second clad layer of the second semiconductor optical waveguide of the semiconductor optical modulator according to the disclosure includes the p-type semiconductors at both ends in the light propagation direction, and the plural first semiconductor optical waveguide and the plural second semiconductor optical waveguides may be alternately connected in the light propagation direction.

In the second clad layer of the second semiconductor optical waveguide, because the n-type semiconductor is sandwiched between the two p-type semiconductors, pn junctions having small capacitances are generated at both ends of the second clad layer. Therefore, the high-frequency electric signal can be prevented from leaking onto the second semiconductor optical waveguide side from the first semiconductor optical waveguide.

The optical modulating apparatus according to the disclosure is a Mach-Zehnder interferometer type optical modulating apparatus in which the semiconductor optical modulators are combined as one or plural pairs of arm waveguides. The different electric signals are provided to the one or plural pairs of phase modulators respectively that are of the arm waveguide, and the right and left optical signals are multiplexed, which allows the input light to be intensity-modulated.

According to the disclosure, the npin-type semiconductor optical modulator in which the waveguide electric separation can be performed while the optical diffraction loss decreases and an optical modulating apparatus in which the npin-type semiconductor optical modulator is used can be provided.

BRIEF DESCRIPTION OF DRAWINGS

FIG. 4(a) is a top view, FIG. 4(b) is a front view, and FIG. 4(c) is a side view.

DETAILED DESCRIPTION OF THE PREFERRED EMBODIMENT

Embodiments of the disclosure will be described with reference to the accompanying drawings. The following embodiments are described only by way of example, and the disclosure is not limited to the following embodiments. In the description and drawings, the same component is designated by the same numeral.

(First Embodiment)

Figure 4:
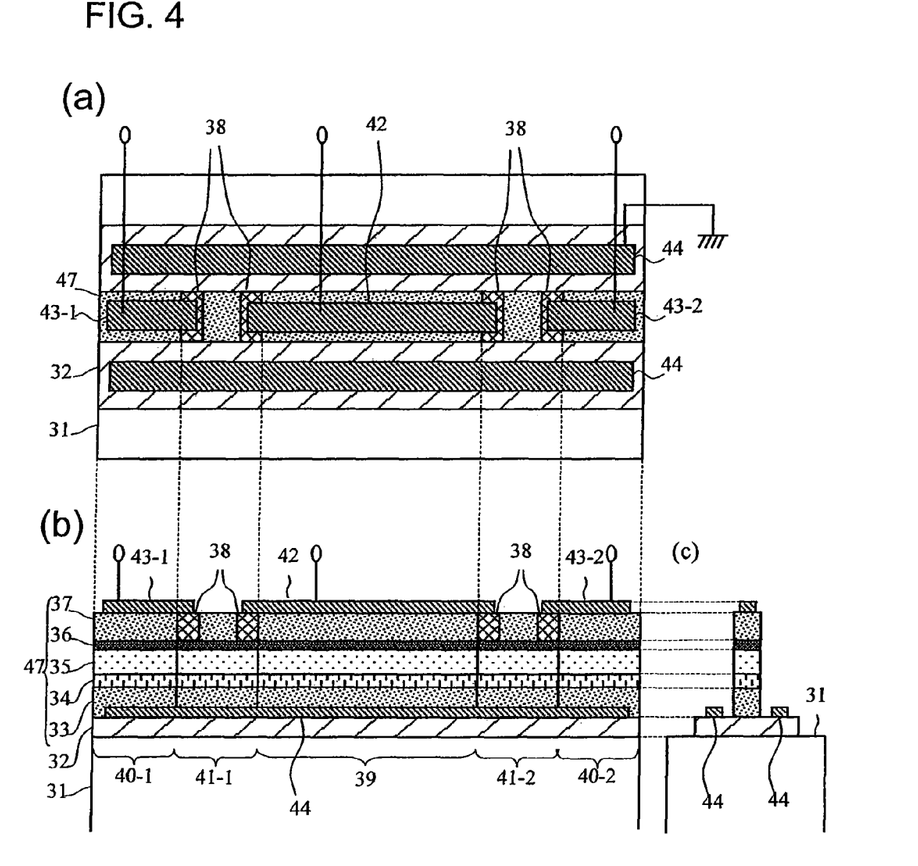
FIG. 4 is a view illustrating a configuration of a semiconductor optical modulator according to an embodiment of the disclosure.

FIG. 4 is a view illustrating a configuration of a semiconductor optical modulator according to a first embodiment of the disclosure. FIG. 4(a) is a top view, FIG. 4(b) is a front view, and FIG. 4(c) is a side view. Hereinafter, when the suffix is not added, the description is one that is common to all the suffixes. The semiconductor optical modulator of FIG. 4 includes: a first semiconductor optical waveguide 39 that has an electro-optic effect, the first semiconductor optical waveguide 39 having a laminated structure 47 including a core layer 34, an n-type first clad layer 33, an n-type second clad layer 37, and a p-type barrier layer 36, the n-type first clad layer 33 and the n-type second clad layer 37 being disposed below and above the core layer 34, the n-type first clad layer 33 and the n-type second clad layer 37 which have refractive indexes lower than that of the core layer 34 being made of an n-type semiconductor whose bandgap is wider than that of the core layer 34, the p-type barrier layer 36 being inserted between the n-type second clad layer 37 and the core layer 34, the p-type barrier layer 36 in which a potential barrier against electrons is formed being made of a p-type semiconductor; a second semiconductor optical waveguide 41 that is connected to the first semiconductor optical waveguide 39 in a light propagation direction, the second semiconductor optical waveguide 41 having the laminated structure 47 in which the n-type second clad layer 37 has the p-type semiconductor 38 penetrating locally through the n-type semiconductor in a laminated direction in the laminated structure 47 of the first semiconductor optical waveguide 39; a first electrode 44 that is connected to the n-type first clad layer 33 of the first semiconductor optical waveguide 39; and a second electrode 42 and a second electrode 43 that electrically connect the first semiconductor optical waveguide 39 of the n-type second clad layer 37 and the p-type semiconductor 38 of the n-type second clad layer 37 of the second semiconductor optical waveguide 41.

The semiconductor optical modulator of FIG. 4 also includes a semiconductor substrate 31 on which the first semiconductor optical waveguide 39 and the second semiconductor optical waveguide 41 are formed, wherein the laminated structure 47 of the first semiconductor optical waveguide 39 and the laminated structure 47 of the second semiconductor optical waveguide 41 further include: an n-type electrode layer 32 that is located between the n-type first clad layer 33 and the semiconductor substrate 31; a first low-concentration clad layer that is located between the n-type first clad layer 33 and the core layer 34, an impurity concentration of the first low-concentration clad layer being lower than that of the n-type first clad layer 33; and a second low-concentration clad layer 35 that is located between the core layer 34 and the p-type barrier layer 36, an impurity concentration of the second low-concentration clad layer 35 being lower than that of the p-type barrier layer 36. The first low-concentration clad layer is not illustrated in FIG. 4.

The semiconductor substrate 31 is an InP substrate that is of a semi-insulating semiconductor. The n-type electrode layer 32 is an n-type InP semiconductor layer whose impurity concentration is higher than that of the n-type first clad layer 33. The n-type first clad layer 33 is an n-type InP semiconductor layer. The core layer 34 is a layer in which a multiple quantum well structure is formed by an InGaAs thin film and an InGaAlAs thin film. The second low-concentration clad layer 35 is a p-type InP semiconductor layer whose impurity concentration is lower than that of the p-type barrier layer 36. The p-type barrier layer 36 is a p-type InP semiconductor layer. The n-type second clad layer 37 is an n-type InP semiconductor layer. The p-type semiconductor 38 is a p-type InP semiconductor that is locally formed in the n-type InP semiconductor layer of the n-type second clad layer 37. At this point, the refractive indexes of the n-type first clad layer 33 and the n-type second clad layer 37 are lower than that of the core layer 34 such that the light can propagate through the core layer 34. And the bandgaps of the n-type first clad layer 33 and the n-type second clad layer 37 is wider than that of a well layer of the core layer 34.

The n-type second clad layer 37 in the second semiconductor optical waveguide 41 of the semiconductor optical modulator of FIG. 4 includes the p-type semiconductors 38 at both ends in the light propagation direction, and in the n-type second clad layer 37, a first semiconductor optical waveguide 40-1, the first semiconductor optical waveguide 39, a first semiconductor optical waveguide 40-2, a second semiconductor optical waveguide 41-1, and a second semiconductor optical waveguide 41-2 are alternately connected in the light propagation direction.

In the semiconductor optical modulator of FIG. 4, the first semiconductor optical waveguide 39 is configured as an active waveguide that acts as an optical modulating unit. And, in the semiconductor optical modulator of FIG. 4, the second semiconductor optical waveguide 41-1 and the second semiconductor optical waveguide 41-2, which are configured as a connection waveguide that acts as an electric signal separating unit, are disposed at both ends of the first semiconductor optical waveguide 39. Furthermore, in the semiconductor optical modulator of FIG. 4, the first semiconductor optical waveguide 40-1 and the first semiconductor optical waveguide 40-2 are disposed as passive waveguides outside the second semiconductor optical waveguide 41-1 and the second semiconductor optical waveguide 41-2.

The second electrode 42 is an electrode that is connected to both the n-type second clad layer 37 of the first semiconductor optical waveguide 39 and the p-type semiconductor 38 of the n-type second clad layer 37 of the second semiconductor optical waveguide 41. The second electrode 42 of FIG. 4 is connected to the p-type semiconductor 38 of the n-type second clad layer 37 of the second semiconductor optical waveguide 41 located closest to the first semiconductor optical waveguide 39. The second electrode 43 is an electrode that is connected to both the n-type second clad layer 37 of the first semiconductor optical waveguide 40 and the p-type semiconductor 38 of the n-type second clad layer 37 of the second semiconductor optical waveguide 41. The second electrode 43 of FIG. 4 is connected to the p-type semiconductor 38 of the n-type second clad layer 37 of the second semiconductor optical waveguide 41 located closest to the first semiconductor optical waveguide 40. The first electrode 44 is connected to the n-type electrode layer 32.

In producing the semiconductor optical modulator of FIG. 4, the n-type electrode layer 32 is epitaxially grown on the semiconductor substrate 31, and each semiconductor layer included in the laminated structure 47 is epitaxially grown on the n-type electrode layer 32. Then, a portion corresponding to the p-type semiconductor 38 is formed by a technique such as ion implantation and selective epitaxial regrowth. Then, each semiconductor layer included in the laminated structure 47 is etched while remains partially, thereby forming a mesa type waveguide. In addition, the second electrode 42, the second electrode 43, and the first electrode 44 are formed in predetermined positions. And a passivation film may be deposited in order to protect the mesa surface if needed. Herein, the first semiconductor optical waveguide and the second semiconductor optical waveguide are names for describing the disclosure. The first semiconductor optical waveguide and the second semiconductor optical waveguide are not in mechanical contact with each other and, as described above, each semiconductor layer is simultaneously formed on the same substrate, therefore, a connection surface does not exist between the first semiconductor optical waveguide and the second semiconductor optical waveguide.

In order to operate the semiconductor optical modulator of FIG. 4, it is necessary to apply a predetermined DC bias. When a negative DC bias Vbias-A relative to the first electrode 44 is applied to the second electrode 42, the core layer 34, the second low-concentration clad layer 35, and the p-type barrier layer 36 are depleted partially or wholly to put the semiconductor optical modulator into a normal state in which a voltage is induced in the core layer 34. At this point, because the potential barrier is formed against electrons irrespective of the fact that part of the p-type barrier layer 36 is neutralized or completely depleted, the electrons are substantially prevented from being implanted from the n-type second clad layer 37. A DC bias Vbias-P1 and a DC bias Vbias-P2 are applied to the first semiconductor optical waveguide 40-1 and the first semiconductor optical waveguide 40-2, which acts as passive waveguides, from the second electrode 43-1 and the second electrode 43-2 respectively.

The second electrode 42 puts the n-type second clad layer 37 of the first semiconductor optical waveguide 39 and the p-type semiconductor 38 of the n-type second clad layer 37 of the second semiconductor optical waveguide 41 into the same potential. The second electrode 42 has a function of providing the same potential as the n-type second clad layer 37 of the first semiconductor optical waveguide 39 to the p-type barrier layer 36 through the p-type semiconductor 38. When the p-type barrier layer 36 is depleted, the function is not exerted. On the other hand, when holes remain in part of the p-type barrier layer 36 to neutralize the p-type barrier layer 36, the p-type barrier layer 36 is put into a fixed potential by the function to suppress instability of the floating state. For example, DC light having constant light intensity is incident from the side of the first semiconductor optical waveguide 40-1. The refractive index of the core layer 34 of the first semiconductor optical waveguide 39 changes by an electric signal input to the second electrode 42, and the incident DC light is modulated by the first semiconductor optical waveguide 39 and output as a light modulation signal from the side of the first semiconductor optical waveguide 40-2.

In the structure of the first embodiment, the second semiconductor optical waveguide 41 does not completely separate the n-type second clad layer 37 of the first semiconductor optical waveguide 39 and the n-type second clad layer 37 of the first semiconductor optical waveguide 40. In the state in which holes remain in the p-type barrier layer 36, an electric conduction state is generated between the n-type second clad layer 37 of the first semiconductor optical waveguide 39 and the n-type second clad layer 37 of the first semiconductor optical waveguide 40. Hereinafter a current caused by the electric conduction state is referred to as "DC leakage current". However, because the p-type barrier layer 36 has a sufficiently high resistance, even if a voltage difference exists between the second electrode 42 and the second electrode 43, a DC leakage current caused by the voltage difference can substantially be suppressed within a range in which the DC leakage current has no influence on the modulation operation. Coupling in the light propagation direction in the portion of the n-type second clad layer 37 of the second semiconductor optical waveguide 41 is cut off by a pn junction between the p-type semiconductor 38 and another n-type semiconductor.

The resistance of the p-type barrier layer 36 will be described by taking an example. Assuming that the p-type barrier layer 36 has the layer thickness of 200 angstroms in which holes remain and hole density of $1 \times 10^{18}/cm^3$, it is computed that the p-type barrier layer 36 has a sheet resistance of about 3 MΩ, and it can be estimated that the p-type barrier layer 36 has the resistance of about 100 MΩ when the high-resistance line has a length of 50 μm. The DC leakage current becomes as small as 0.1 μA even if a potential difference of 10 V exists between the DC bias Vbias-A and the DC bias Vbias-P1 or the DC bias Vbias-P2. Accordingly, even if the DC bias Vbias-P1 and the DC bias Vbias-P2 are equal to or different from the DC bias Vbias-A, a constant phase change can be provided to the input optical signal by adjusting the DC bias Vbias-P1 and the DC bias Vbias-P2.

In the n-type second clad layer 37 of the second semiconductor optical waveguide 41, because the n-type semiconductor is sandwiched between the two p-type semiconductors 38, the pn junctions having small capacitances are generated at both ends of the n-type second clad layer 37. Therefore, the high-frequency electric signal can be prevented from leaking to the side of the second semiconductor optical waveguide 41 from the second electrode 42. The same holds true for the state in which holes remain in the p-type barrier layer 36 of the second semiconductor optical waveguide 41. This is because the n-type semiconductor portion sandwiched between the two p-type semiconductors 38 of the second semiconductor optical waveguide 41 is a high-resistance line that has the sufficiently high electric resistance for the high-frequency electric signal and the propagation of the high-frequency electric signal is generated only in the n-type semiconductor portion of the second semiconductor optical waveguide 41. The high-frequency electric signal attenuates largely in a frequency range of about 1 kHz or more, and a signal propagation distance becomes shorter than a length of the second semiconductor optical waveguide 41. Although the second semiconductor optical waveguide 41 is a parasitic line for the first semiconductor optical waveguide 39, the second semiconductor optical waveguide 41 always has high reflection because of the high-resistance line when viewed from a connection node, and the light modulation operation is not disturbed by the second semiconductor optical waveguide 41.

As described above, the semiconductor optical modulator of FIG. 4 has the structure in which the second semiconductor optical waveguide acts as the connection waveguide, so that the potential at the barrier layer portion in the npin-type configuration can be fixed to prevent the leakage of the DC bias and electric signal through the barrier layer. And there is little influence on the modulation operation even in the high bias state in which the p-type barrier layer is depleted, and the range in which the DC bias can normally be operated can be widen compared with the conventional semiconductor optical modulator.

Furthermore, the element structure of the first embodiment is not influenced by the change in dark current caused by the change of the surface state of a junction mesa constituting the semiconductor optical waveguide, and the semiconductor optical modulator can have excellence in long-term reliability.

In the first embodiment, it is described the example that the InP clad layer and the InGaAs/InGaAlAs quantum well core layer are used as the semiconductor material, however, a configuration in which InGaAlAs is replaced by InGaAsP and a configuration in which InGaAsP and InGaAlAs are combined can basically be used as well, and there is no limitation to the kind of the semiconductor material.

(Second Embodiment)

Figure 5:
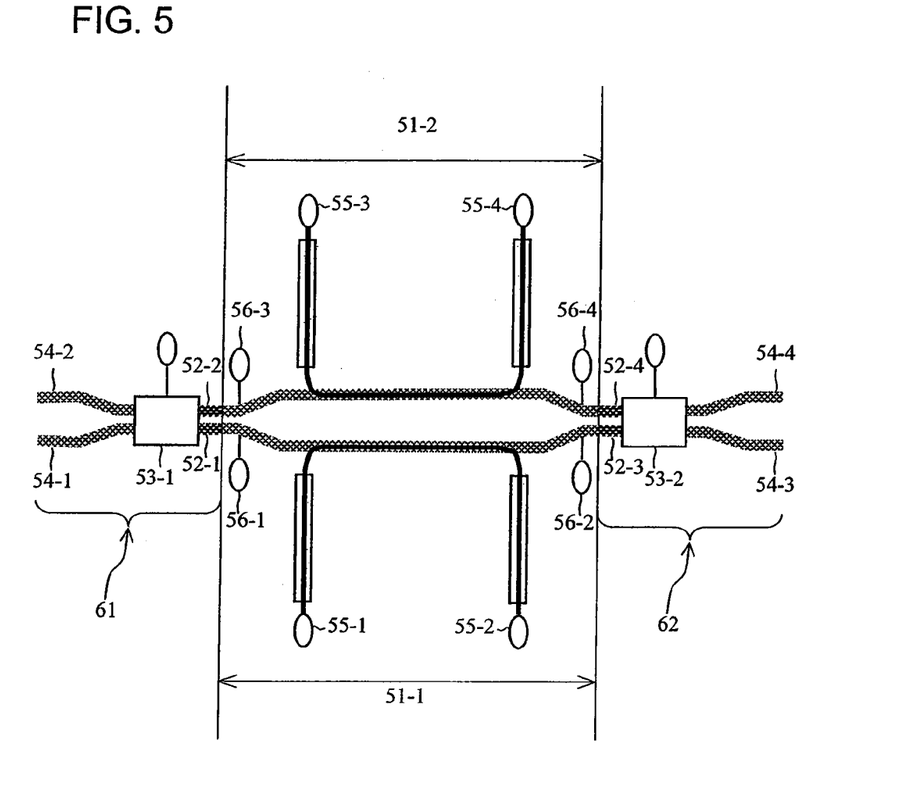
FIG. 5 is view illustrating a schematic configuration of an optical modulating apparatus according to an embodiment of the disclosure.

FIG. 5 is a view illustrating a schematic configuration of an optical modulating apparatus according to an embodiment of the disclosure. The optical modulating apparatus of FIG. 5 is a Mach-Zehnder interferometer type optical modulating apparatus which the semiconductor optical modulator of the first embodiment is used as an arm waveguide. The optical modulating apparatus of FIG. 5 includes a semiconductor optical modulator 51, an optical demultiplexing circuit 61, and an optical multiplexing circuit 62.

The semiconductor optical modulator 51 is the semiconductor optical modulator of the first embodiment. A semiconductor optical modulator 51-1 includes an electric-signal input terminal 55-1 through which the electric signal to be modulated is input to the first semiconductor optical waveguide that is of the active waveguide and an electric-signal output terminal 55-2 that is used for a terminal end of the electric signal. Similarly the semiconductor optical modulator 51-2 includes an electric-signal input terminal 55-3 and an electric-signal output terminal 55-4. The semiconductor optical modulator 51-1 includes a bias terminal 56-1 and a bias terminal 56-2, which apply the DC bias to the first semiconductor optical waveguide that is of the passive waveguide. Similarly the semiconductor optical modulator 51-2 includes a bias terminal 56-3 and a bias terminal 56-4.

The optical demultiplexing circuit 61 includes an optical input waveguide 54-1, an optical input waveguide 54-2, a multi-mode interferometer 53-1, an electric separation waveguide 52-1, and an electric separation waveguide 52-2. The optical input waveguide 54-1 and the optical input waveguide 54-2 are optical waveguides to which the DC light having constant light intensity is incident. The multi-mode interferometer 53-1 branches the input DC light into two pieces of DC light and outputs the two pieces of DC light to the electric separation waveguide 52-1 and the electric separation waveguide 52-2.

The optical multiplexing circuit 62 includes an optical output waveguide 54-3, an optical output waveguide 54-4, a multi-mode interferometer 53-2, an electric separation waveguide 52-3, and an electric separation waveguide 52-4. The pieces of signal light, modulated by the semiconductor optical modulator 51-1 and the semiconductor optical modulator 51-2, are input to the multi-mode interferometer 53-2 through the electric separation waveguide 52-3 and the electric separation waveguide 52-4, and the multi-mode interferometer 53-2 multiplexes the input pieces of signal light and outputs the multiplexed signal light to the optical output waveguide 54-3 and the optical output waveguide 54-4.

In operating the optical modulating apparatus of FIG. 5, the DC light is introduced from the optical input waveguide 54-1 or the optical input waveguide 54-2, the DC bias is appropriately applied to the bias terminal 56-4 from the multi-mode interferometer 53-1, the multi-mode interferometer 53-2, and the bias terminal 56-1, and the modulation signal is provided from the input terminal 55-1 and the input terminal 55-3. The pieces of DC light branched by the multi-mode interferometer 53-1 are introduced to the two semiconductor optical waveguides and phase-modulated by the input electric signal as described in the first embodiment. The pieces of phase-modulated light are intensity-modulated by the light multiplexing in the multi-mode interferometer 53-2 and output from the optical input/output waveguide 54-3 and the optical input/output waveguide 54-4.

The MZ optical modulating apparatus having small optical loss can be formed by utilizing the semiconductor optical modulator of the first embodiment.

In the embodiments, the single intensity modulating apparatus is used or alternatively, a cross connect type optical switch may be formed by connecting the intensity modulating apparatuses in multi stages. A modulating apparatus, such as an intensity phase modulator, which has a higher function can be formed by combining the intensity modulating apparatus and the phase modulator described in the first embodiment.

The invention claimed is:

1. A semiconductor optical modulator comprising:
a first semiconductor optical waveguide that has an electro-optic effect, the first semiconductor optical waveguide having a laminated structure including a core layer, a first clad layer, a second clad layer, and a barrier layer, the first clad layer and the second clad layer being disposed below and above the core layer, the first clad layer and the second clad layer which have refractive indexes lower than that of the core layer being made of an n-type semiconductor whose bandgap is wider than that of the core layer, the barrier layer being inserted between the second clad layer and the core layer, the barrier layer in which a potential barrier against electrons is formed being made of a p-type semiconductor;
a second semiconductor optical waveguide that is connected to the first semiconductor optical waveguide in a light propagation direction, the second semiconductor optical waveguide having a laminated structure including a core layer, a first clad layer, a second clad layer, and a barrier layer, the first clad layer and the second clad layer being disposed below and above the core layer, the first clad layer and the second clad layer which have refractive indexes lower than that of the core layer being made of an n-type semiconductor whose bandgap is wider than that of the core layer, the barrier layer being inserted between the second clad layer and the core layer, the barrier layer in which a potential barrier against electrons is formed being made of a p-type semiconductor, the second clad layer has the p-type semiconductor penetrating locally through the n-type semiconductor in a laminated direction in the laminated structure;
a first electrode that is connected to the first clad layer of the first semiconductor optical waveguide; and
a second electrode that electrically connects the second clad layer of the first semiconductor optical waveguide and the p-type semiconductor of the second clad layer of the second semiconductor optical waveguide;
wherein the second clad layer of the second semiconductor optical waveguide includes the p-type semiconductors at both ends in the light propagation direction,
a plurality of first semiconductor optical waveguides and a plurality of second semiconductor optical waveguides are alternately connected in the light propagation direction, and
wherein the second electrode is discontinuous so that the second electrode does not contact to the second clad layer of the second semiconductor optical waveguide.

2. The semiconductor optical modulator according to claim 1, further comprising a substrate on which the first semiconductor optical waveguide and the second semiconductor optical waveguide are formed,
wherein the laminated structure of the first semiconductor optical waveguide and the laminated structure of the second semiconductor optical waveguide further include: an n-type electrode layer that is located between the first clad layer and the substrate; a first low-concentration clad layer that is located between the first clad layer and the core layer, an impurity concentration of the first low-concentration clad layer being lower than that of the first clad layer; and a second low-concentration clad layer that is located between the core layer and the barrier layer, an impurity concentration of the second low-concentration clad layer being lower than that of the barrier layer.

3. A Mach-Zehnder interferometer type optical modulating apparatus, in which the semiconductor optical modulators as in claim 2 are combined as one or plural pairs of arm waveguides.

4. A Mach-Zehnder interferometer type optical modulating apparatus, in which the semiconductor optical modulators as in claim 1 are combined as one or plural pairs of arm waveguides.

* * * * *